(No Model.)
J. H. DENISON.
FEED BOX.
No. 516,922. Patented Mar. 20, 1894.
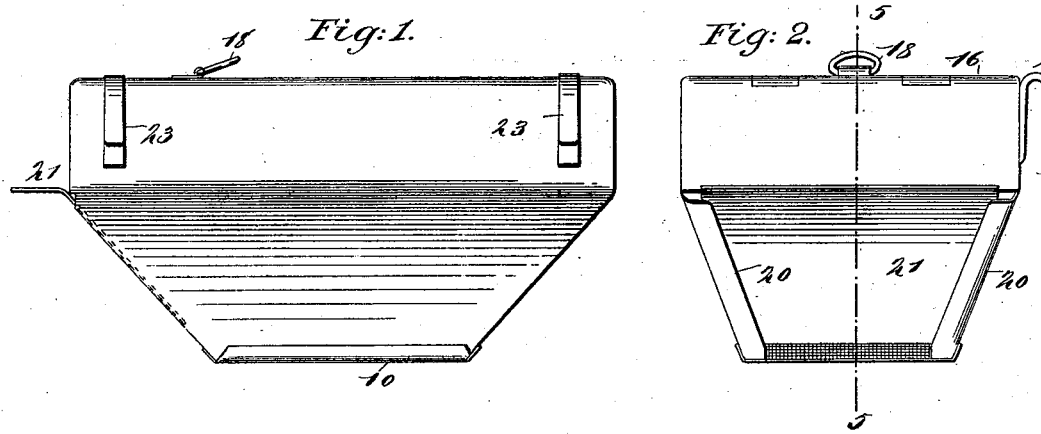
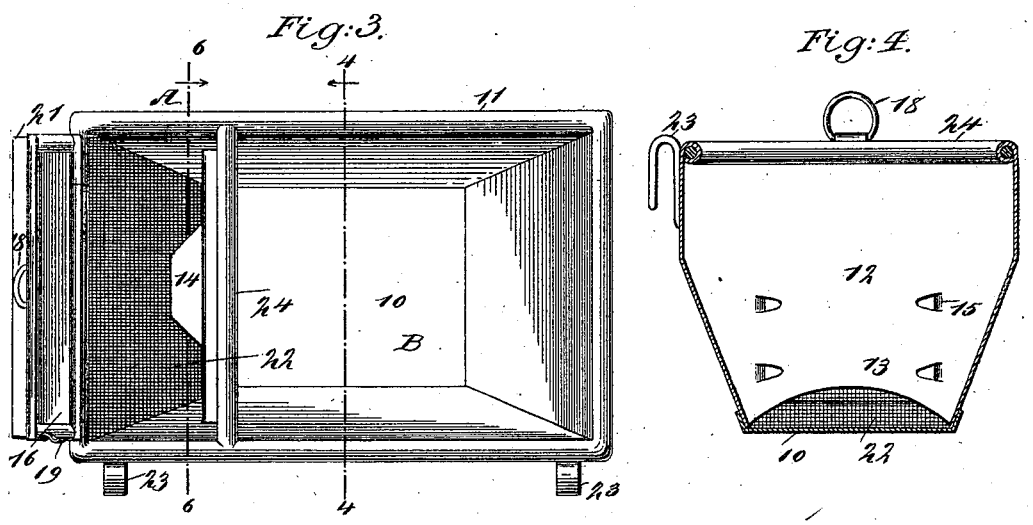
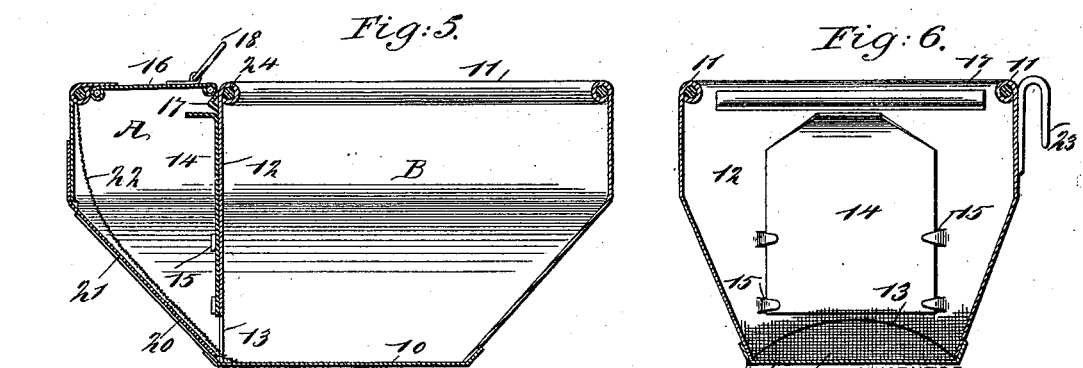
WITNESSES:
John A. Rennie
C. Sedgwick
INVENTOR
J. H. Denison
BY Munn & Co
ATTORNEYS.

UNITED STATES PATENT OFFICE.

JOHN HUSTON DENISON, OF MAQUON, ILLINOIS.

FEED-BOX.

SPECIFICATION forming part of Letters Patent No. 516,922, dated March 20, 1894.

Application filed November 25, 1893. Serial No. 491,987. (No model.)

*To all whom it may concern:*

Be it known that I, JOHN HUSTON DENISON, of Maquon, in the county of Knox and State of Illinois, have invented a new and Improved Feed-Box, of which the following is a full, clear, and exact description.

My invention is an improvement in the class of feed-troughs or boxes having two compartments, one for containing a quantity of feed which is gradually fed into the other one, where it becomes accessible to the animal.

The invention consists in the novel construction and combination of the several parts, as will be hereinafter more fully set forth and pointed out in the claim.

Reference is to be had to the accompanying drawings forming a part of this specification, in which similar figures and letters of reference indicate corresponding parts in all the views.

Figure 1 is a side elevation of the feed trough. Fig. 2 is an end view thereof. Fig. 3 is a plan view. Fig. 4 is a central transverse section taken practically on the line 4—4 of Fig. 3. Fig. 5 is a longitudinal vertical section taken essentially on the line 5—5 of Fig. 2; and Fig. 6 is a transverse vertical section taken through the reservoir and practically on the line 6—6 of Fig. 3.

The feed trough or box may be made of any desired material; metal, however is preferred. Usually the box is given a rectangular shape in plan view, and the upper portion of its sides and ends is straight, while from the center of the said sides and ends the body of the box or trough is inclined downward to meet the bottom 10, which is located at the center of the box. By means of this construction the feed will likewise be concentrated at the center, and the animal while feeding will not be liable to spill or throw the feed over the edges of the box, especially as at the upper edge of the box an inwardly-extending flange or rib 11 is produced. Adjacent to one end of the bottom portion 10 of the box or trough a transverse partition 12, is erected, and this partition is provided with an opening 13 in its bottom, the said opening being ordinarily of an arched shape, as illustrated in Fig. 4. The partition extends from top to bottom of the trough or box, and the space between it and the adjacent end of the box is adapted to constitute a storage compartment A.

The storage compartment or reservoir A, is adapted to receive the feed, and it is delivered into the body of the box through the opening in the partition 12. The amount of feed delivered is regulated by means of a gate 14, which is held to slide upon the partition within the reservoir or storage chamber A, suitable guides being provided upon the partition for the reception of the gate, as shown in Fig. 6, in which the guides are designated as 15. It will thus be observed that a predetermined quantity of grain for example, may be constantly fed into the main or feeding compartment of the box, and that the amount to be delivered into the feeding compartment from the reservoir may be increased or decreased according to the area of the opening uncovered by the gate.

The storage compartment or reservoir A of the box is provided with a lid or cover 16, which is preferably hinged to the end flange of the body, and the cover closes down upon a suitable rest 17 produced upon the partition. The cover is conveniently raised and lowered through the medium of an attached ring 18, knob or its equivalent; or any approved form of latch may be employed for holding the cover in a closed position. In the drawings the ordinary spring tongue 19, is used, attached to one side of the lid, which when the latter is closed engages with one of the side flanges of the box body.

The inclined end surface of the box which forms a portion of the end wall of the reservoir or storage chamber, is open at the bottom, and slideways 20, are produced at each side of the said end portion, as shown in Fig. 2, whereby the opening may be closed through the medium of a slide 21, adapted to be fitted in the slide-ways and to engage with the bottom 10 of the body. The opening covered by the slide 21 is for the purpose of facilitating the automatic screening of the grain or feed when such treatment is necessary; and this is accomplished by locating within the storage compartment or reservoir a screen 22, which screen is attached in any suitable or approved manner to the end of the box body, preferably below the hinge of the cover, and the said screen covers the opening produced in the end, and the lower end of the screen rests upon the bottom 10 of the body. Thus it will be observed that when the slide 21 is removed, the grain or other feed in moving downward in direction of the bottom of the feeding compartment will in passing over the screen free itself from chaff or like foreign matter.

The box is to be attached to any convenient support, as for example the side of a wagon body, or a convenient fence, by means of brackets 23, which are secured preferably to one side surface of the box; but any other equivalents of the brackets may be employed if in practice it is found desirable.

The partition 12 is provided at its upper edge with a flange or rib 24, extending inwardly in direction of the feeding compartment, so it will be observed that a rib or flange is provided extending around the entire margin of this compartment, which is designated in the drawings as B.

Having thus described my invention, I claim as new and desire to secure by Letters Patent—

In a feed box or trough, the combination, with a box like body having the upper portion of its sides and ends straight and its lower portions inclined downwardly and inwardly to a central panel, one end of the body being provided with an opening and slideways adjacent to the opening, and a marginal flange or rib located at the upper portion of the body, of a partition located adjacent to the open end of the body, dividing said body into a feeding and a storage compartment, said partition being provided with a gated opening near its bottom, a lid adapted to cover the storage compartment, a screen covering the opening in the end of the body, and a removable slide adapted to fit in the slideways and concealing the screen, substantially as and for the purpose specified.

JOHN HUSTON DENISON.

Witnesses:
DAVE. MCATEE,
T. L. SCROGGIN.